United States Patent [19]

Ishiwata et al.

[11] Patent Number: 4,998,461
[45] Date of Patent: Mar. 12, 1991

[54] TWO-PART PLASTIC PISTON WITH EXCESS RESIN RECEIVING GROOVE

[75] Inventors: Ichiro Ishiwata; Tomomichi Karasuyama, both of Kanagawa, Japan

[73] Assignee: Nippon Air Brake Co., Ltd., Kobe, Japan

[21] Appl. No.: 303,660

[22] Filed: Jan. 30, 1989

[30] Foreign Application Priority Data

Aug. 3, 1988 [JP] Japan ................ 63-29746[U]

[51] Int. Cl.⁵ ................................ F16J 9/00
[52] U.S. Cl. ........................ 92/248; 92/260; 60/533
[58] Field of Search ............ 92/240, 248, 260, 172; 60/533; 156/73.1

[56] References Cited

U.S. PATENT DOCUMENTS

| | | | |
|---|---|---|---|
| 3,775,189 | 11/1973 | Jaggard | 156/73.1 X |
| 4,528,895 | 7/1985 | Nakamura | 92/248 X |
| 4,628,579 | 12/1986 | Taylor | 92/170.1 X |
| 4,831,916 | 5/1989 | Leigh-Monstevens et al. | 92/248 X |
| 4,856,282 | 8/1989 | Leigh-Monstevens et al. | 60/589 |
| 4,867,641 | 9/1989 | Okuno et al. | 60/364 X |

FOREIGN PATENT DOCUMENTS

| | | | |
|---|---|---|---|
| 448212 | 5/1949 | Italy | 60/533 |
| 48301 | 1/1983 | Japan | 92/248 |
| 48309 | 9/1983 | Japan | 92/248 |
| 59-34970 | 2/1984 | Japan . | |
| 63-180459 | 11/1988 | Japan . | |

*Primary Examiner*—Edward K. Look
*Assistant Examiner*—John Ryznic
*Attorney, Agent, or Firm*—Wenderoth, Lind & Ponack

[57] ABSTRACT

A plastic piston of master cylinder has a first member having a small diameter portion and a second member having a large bore portion. Excess welding resin is prevented from being leaked into a seal ring mounting groove formed on a part of the outer peripheral surface of the small diameter portion by provision of welding portions in the form of a space defined between an outer peripheral surface of the small diameter portion of the first member and the large bore portion of the second member, and a gap defined between a tip end of the small diameter portion of the first member and the bottom of the large bore portion, the space and gap being provided respectively for preventing the excess welding resin from being leaked into the seal ring mounting groove. The plastic piston has no parting lines along the seal ring mounting groove which results in achieving a superior seal effect.

1 Claim, 3 Drawing Sheets

TWO-PART PLASTIC PISTON WITH EXCESS RESIN RECEIVING GROOVE

BACKGROUND OF THE INVENTION

1. Field of the Invention

The present invention relates to a plastic piston of master cylinder for a hydraulic clutch or brake system mounted on a vehicle.

2. Description of the Prior Art

These is known a master cylinder, for example, as disclosed in Japanese Utility Model Laid-Open Publication No. 59-32557 which is illustrated in FIG. 6.

A cylinder body 1 of a tandem master cylinder comprises a bore portion 2 defined in the cylinder body 1 open at the rear end thereof and closed at the front end thereof, and bosses 3, 4 protruding from a peripheral surface of the cylinder body 1 for connecting with an operating fluid reservoir (not shown). There are slidably accommodated in the bore portion 2 a first piston 6 connected to a spring device 5 and positioned toward the an open end 2A of the bore portion 2, a second piston 7, and a spring 8 disposed between the closed end 2B of the bore portion 2 and the bottom of a bore portion 9 of the second piston 7. The spring device 5 comprises a spring 10 for returning the first piston 6, a bearing or retainer 11 for receiving an end of the spring 10 and brought into contact with an end surface of the first piston 6, a retainer 12 of a cup shape for receiving the other end of the spring 10 and brought into contact with an end surface of the second piston 7, and a bolt 13 extending into the retainer 12 and screwed into the end surface of the first piston 6. The first piston 6 has sliding portions 14A, 14B provided around an outer periphery thereof and disposed at both ends thereof and a hole 15 for engaging with a push rod (not shown) at the central portion of the rear end thereof while the rear end is brought into contact with a stopper 18. A liquid supply chamber 16 is defined in the bore portion 2 around the outer periphery of the first piston 6 between the sliding portion 14A and a flange 14a provided at the portion spaced from the sliding portion 14A while the liquid supply chamber 16 communicates with the inside of the boss 4 via a liquid supply hole 19. A main pressure chamber 17 is defined between the first piston 6 and the second piston 7 and communicates with the boss 4 via a return hole 21. The second piston 7 has sliding portions 22A, 22B provided around the outer periphery thereof and disposed at the both ends thereof. A liquid supply chamber 23 is defined in the bore portion 2 around the outer periphery of the second piston 7 between the sliding portions 22A, 22B and communicates at all times with the inside of the boss 3 via a liquid supply hole 26 while it communicates with the inside of the boss 3 via a returning hole 27. An auxiliary chamber 24 is defined between the closed end 2B of the bore portion 2 and the second piston 7. The second piston 7 is prevented from being moved further toward the rear end portion thereof by a stopper 25 provided on the cylinder body 1 and projecting into the liquid supply chamber 23. Seal members 28, 29 are respectively provided on a seal mounting portion protruding forwardly from the sliding portion 14A of the first piston 6 and a seal mounting portion defined between the sliding portion 14B and the flange 14a. Seal members 30, 31 are respectively provided on a seal mounting portion protruding from the sliding portion 22A of the second piston 7 and a seal mounting portion provided between the sliding portion 22B and a flange 22b disposed on the portion spaced from the sliding portion 22B.

According to the prior art master cylinder, the first and the second pistons 6, 7 have been molded from metal by a mechanical process. However, the master cylinder of a hydraulic clutch or brake system is proposed to be molded from plastic. Inasmuch as the pistons 6, 7 are integrally molded, it is inevitable that there are produced parting lines on the surface of the piston along guide surfaces of a flash mold, namely extending in the axial direction of the piston. Inasmuch as the parting lines can also be formed on the seal mounting portion wherein the annular seal member or seal ring is mounted, there is a possibility that seal formed between the inner peripheral surface of the seal member or seal ring and the bottom surface of the seal mounting portion will be deteriorated by the parting lines.

The present invention has been made to overcome the problems set forth above and provides a plastic piston obviating the parting lines normally formed on the seal mounting portion.

The above and other objects, features and advantages of the present invention will become more apparent from the following description taken in conjunction with the accompanying drawings.

DESCRIPTION OF PREFERRED EMBODIMENT OF THE PRESENT INVENTION

First Embodiment (FIGS. 1 to 4)

Figure 1:
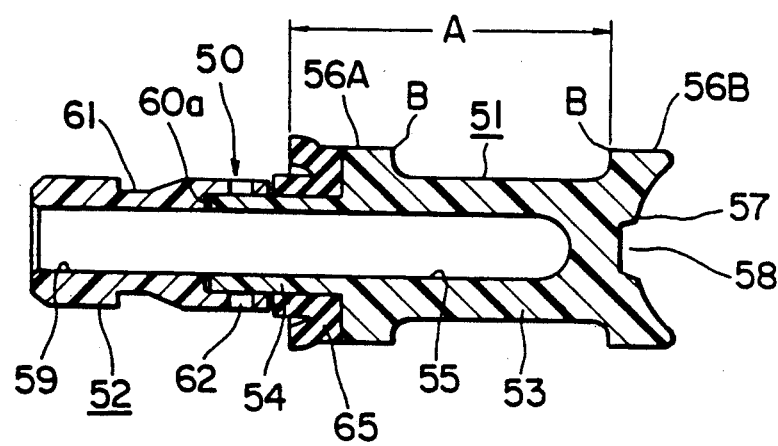
FIG. 1 is a cross sectional view of a plastic piston of a master cylinder according to a first embodiment of the present invention.
Figure 2:
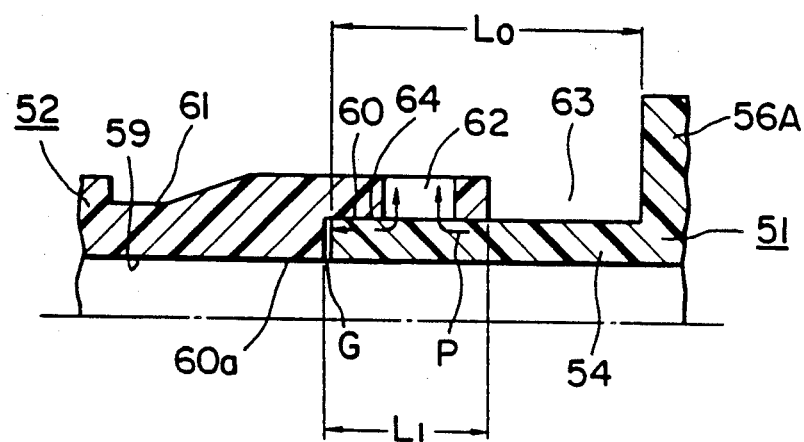
FIG. 2 is an enlarged cross sectional view of a main portion of the plastic piston of FIG. 1.

A first embodiment of the present invention will be described with reference to FIGS. 1 through 4.

A plastic piston 50 to be used as a piston of a master cylinder for use in a hydraulic clutch or brake system (hereafter referred to as simply a piston 50) comprises a first member 51 integrally molded from plastic and a second member 52 integrally molded from plastic in which the first member 51 and the second member 52 are fixedly assembled with each other.

The first member 51 comprises a large diameter portion 53 and a small diameter portion 54 the axial length of which is Lo, forming stepped portion as a whole at the small diameter portion, a bore portion 55 provided inside the first member 51 and having a closed end at the large diameter portion 53 and an open end at the small diameter portion 54, sliding portions 56A and 56B positioned at both ends of the large diameter portion 53 which are respectively greater than other portions of the large diameter portion 53, a notched spherical concave surface 57 and a gate 58 for introducing a welded resin therethrough.

The second member 52 is cylindrical and has a bore portion inside thereof which is open at both ends of the second member 52. The bore portion comprises a small inner diameter portion or a small bore portion 59 and a large diameter portion or a large bore portion 60 having an axial length L1, into which the small diameter portion 54 of the first member 51 is inserted until the tip end of the small diameter portion 54 of the first member 51 reaches the portion adjacent to the bottom 60a of the large bore portion 60, and a gap G is defined between the bottom 60a and the tip end of the small diameter portion 54.

The second member 52 has at the portion around the small bore portion an engaging peripheral groove 61 which is tapered toward the front portion of the second member 52 and is engaged with a holding pawl of a retainer (not shown) which engages an outer periphery of the second member 52. The second member 52 at the portion around the large bore portion 60 has a plurality of recessed portions or apertures 62 which are positioned at a small distance from a bottom 60a thereof and provided around the outer periphery thereof at predetermined intervals from each other.

The inserted and engaged portion of the outer peripheral surface of the small diameter portion 54 and the large bore portion 60 are welded to each other by ultrasonic welding. The small diameter portion 54 thus has defines around the outer peripheral surface thereof a seal ring mounting groove 63 having a groove width extending from the end surface of the large diameter portion 56A to the end surface of the second member 52. That is, the groove width is expressed $L0+G+L1$. Designated at 64 is a welding portion. That is, the large bore portion 60 and the outer peripheral surface of the small diameter portion 54 are welded to each other except in the seal ring mounting groove 63. A seal ring 65, or a cup seal 65 is then engaged with the seal ring mounting groove 63.

Assuming that a predetermined maximum stroke of the piston 50 is LMAX, the interval A between the sliding portion 56B of the large diameter portion 53 of the first member 51 and an end surface of the seal ring 65 at the end surface of the sliding portion 56A is greater than LMAX, for example, if LMAX=26 mm, A=28 mm.

Figure 3:
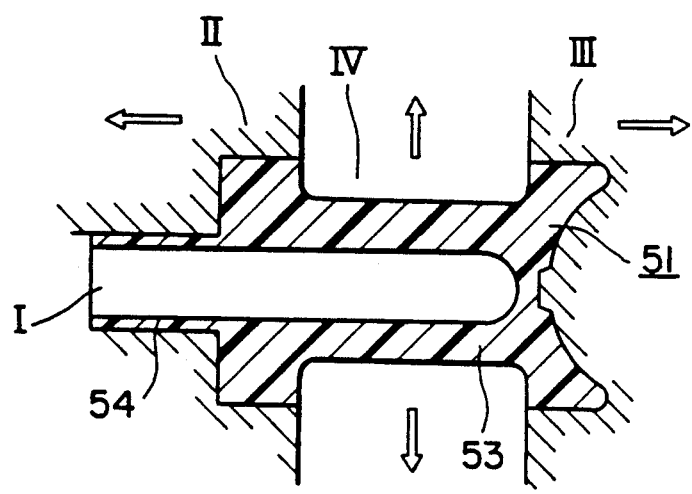
FIGS. 3 and 4 are sectional views of assistance in explaining molds employed in molding the plastic piston of FIG. 2.
Figure 5:
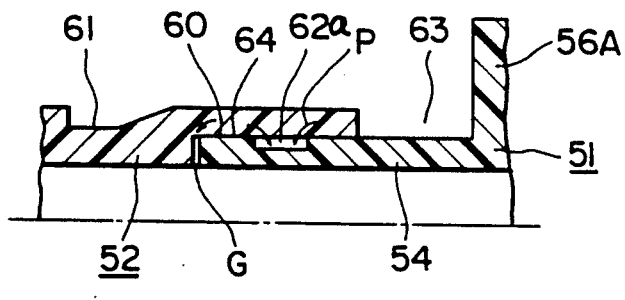
FIG. 5 is an enlarged cross sectional view of a main portion of a plastic piston of a master cylinder according to a second embodiment of the present invention.
Figure 6:
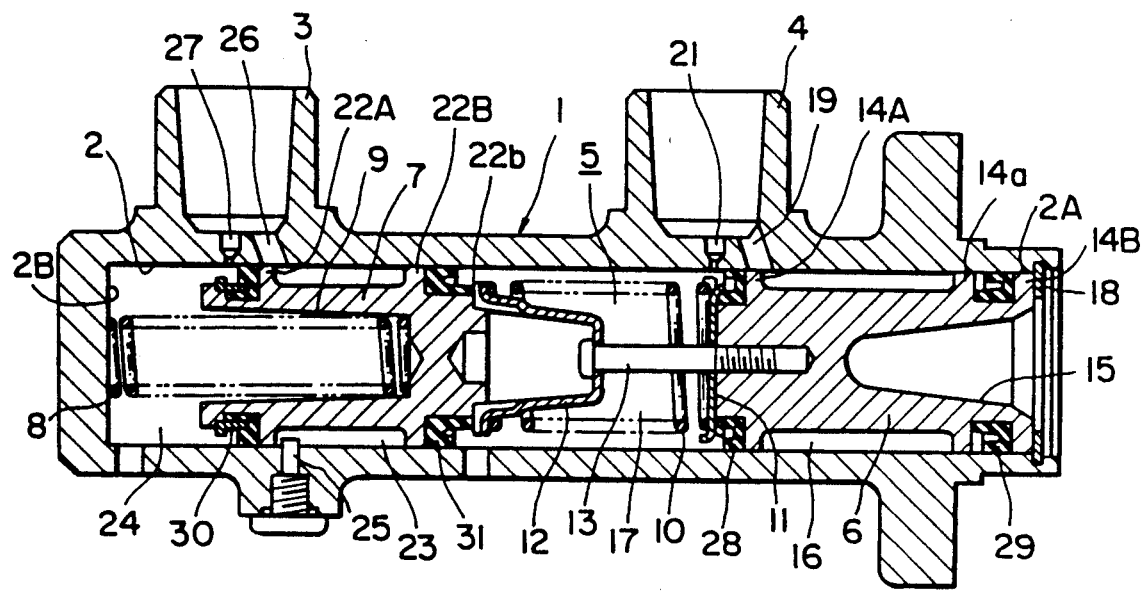
FIG. 6 is a cross sectional view of a prior art master cylinder.

For forming the first member 51, there is employed a combined mold shown in FIG. 5 comprising a first mold I for forming the bore portion 55, a mold II for forming the outer peripheral surfaces of the small diameter portion 54 and the sliding portion 56A, a mold III for forming the sliding portion 56B, the spherical concave surface 57, and the gate 58, and a mold IV for forming the large diameter portion 53 between the sliding portions 56A, 56B of the large diameter portion 53. Arrows in FIG. 3 illustrate directions of separation of the molds. Accordingly, there is not produced any parting lines on the outer peripheral surface of the small diameter portion 54 of the first member 51.

According to the first embodiment, inasmuch as the mold II for forming the small diameter portion 54 of the first member 51 which becomes the bottom surface of the seal ring mounting groove 63 is not a split mold for splitting the molding surface, there is not produced any parting lines on the bottom surface of the seal ring mounting groove 63.

Figure 4:
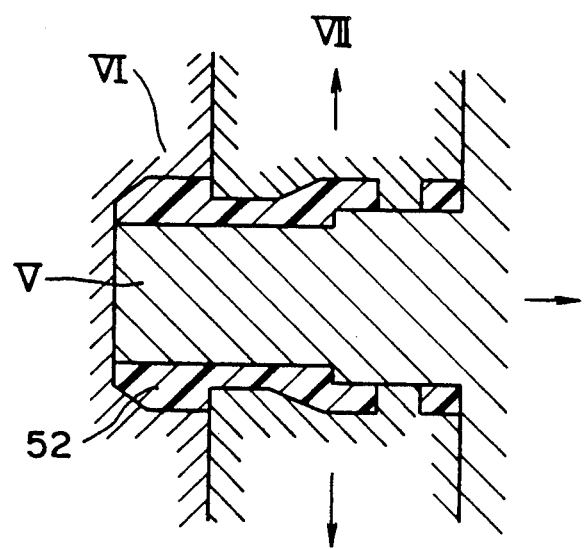

For forming the second member 52, there is employed a combined mold shown in FIG. 4 comprising a mold V, a mold VI, and a mold VII.

Furthermore, according to the first embodiment in which the large bore portion 60 of the second member 52 and an outer peripheral surface of the end portion 54 of the small diameter portion of the first member 51 are welded by a resin P by an ultrasonic welding process, there is a likelihood that the welded resin P will leak toward the seal ring mounting groove 63 through the portion between the large bore portion 60 and the outer peripheral surface of the small diameter portion 54. Existance of the apertures 62 and the gap G prevent excess resin P welded between the outer peripheral surface of the small diameter 54 and the large bore portion 60 from flowing into the seal ring mounting groove 63 since overflowed welded resin P flows partly into the gap G and fills the gap G while others overflowed welded resin P is leaked and flows into the apertures 62 and is retained therein.

If the seal ring 65 is mounted in the seal ring mounting groove 63 into which welded resin has leaked and hardened instead of flowing into the apertures 62 and the gap G, there is produced a gap between the inner peripheral surface of the seal ring 65 and the bottom surface of the seal ring mounting groove 63 whereby the seal effect will be deteriorated. Although flashings are liable to be produced on the first upper inner edge of the sliding portion 56A and the second upper inner edge of the sliding portion 56B which faces the first upper inner edge of the sliding portion 56A respectively illustrated at B in FIG. 1, the seal ring 65 is prevented from sliding on the portion where the second upper inner edge B of the sliding portion 56B slides on the bore portion of the cylinder body in which the piston 50 is inserted since the interval A is set to be greater than the maximum stroke LMAX of the piston 50. Accordingly, even if the flashing generated at the upper inner edge B is forcibly pressed against the inner peripheral surface of the cylinder to generate a scratch on the inner peripheral surface of the cylinder, this does not cause leakage of the liquid due to sliding contact of the seal ring 65 with the scratch nor deterioration of the seal effect.

Second Embodiment (FIG. 5)

A plastic piston of a master cylinder according to a second embodiment of the present invention will be described with reference to FIG. 5.

An arrangement of the plastic piston of master cylinder according to the second embodiment of the present invention is same as that of the first embodiment except that a groove 62a is provided on the small diameter portion 54 of the first member 54 instead of apertures 62 in the second member 52.

With such an arrangement of the plastic piston of a master cylinder of the second embodiment, the same effect can be achieved as that of the plastic piston of a master cylinder of the first embodiment.

With such molding and arrangement of the present invention, it is possible to form the seal ring mounting groove having no parting lines therein since after the first and the second members are separately molded so that the portion forming the seal ring mounting groove does not face the split mold, and the first and the second members can be welded and integrated with each other.

Furthermore, the welded resin can be prevented from being leaked into the seal ring mounting groove due to provision of the welding portions so that the inner peripheral surface of the seal ring can be brought into contact with the bottom surface of the seal ring mounting groove and a superior seal effect can be effected with reliability.

What is claimed is:

1. A plastic cylinder of a master cylinder, comprising:
   a first member made of plastic and composed of a large diameter portion slidable inside a cylinder bore, and a small diameter portion extending axially from the large diameter portion for forming a stepped portion on the large diameter portion;
   a second member made of plastic and having therein a large bore portion having an inner end;
   said small diameter portion of said first member being inserted into and engaged with said large bore portion of said second member and forming a seal ring mounting groove on an outer peripheral surface of said small diameter portion between said stepped portion and the end of said large bore portion of said second member, the length of said small diameter portion in said large bore portion being less than the length of said large bore portion for defining a gap between the end of said small diameter portion and the inner end of said large bore portion, and said small diameter portion having a weld material receiving groove therearound spaced from said gap; and
   a welding portion between the outer peripheral surface of said small diameter portion and extending along the length thereof between said weld material receiving groove and said gap;
   whereby when said first and second members are welded to each other at said weld portion, excess welding resin will flow only into said gap and said weld material receiving groove and will be prevented from escaping to the exterior surface of said large bore portion or to said seal ring mounting groove.

* * * * *